United States Patent [19]

Farfor et al.

[11] 4,210,009
[45] Jul. 1, 1980

[54] REINFORCEMENT FIBRES

[75] Inventors: James D. Farfor, Brighton; Huba Gall, Camberwell, both of Australia

[73] Assignee: Rocla Concrete Pipes Limited, Melbourne, Australia

[21] Appl. No.: 887,339

[22] Filed: Mar. 16, 1978

[30] Foreign Application Priority Data

Mar. 22, 1977 [AU] Australia ............... PC9514

[51] Int. Cl.² ........................................... B21D 28//06
[52] U.S. Cl. ....................................... 72/186; 72/185; 72/197; 83/906
[58] Field of Search ................. 72/185, 186, 197, 187, 72/203, 204; 83/425.3, 906, 408

[56] References Cited

U.S. PATENT DOCUMENTS

| 62,553 | 3/1867 | Martin | 72/186 |
|---|---|---|---|
| 2,739,647 | 3/1956 | Coste | 83/425.3 |
| 3,504,516 | 4/1970 | Sundberg | 72/203 |
| 3,516,315 | 6/1970 | Suzuki | 83/408 |
| 3,650,168 | 3/1972 | Ruschmann | 83/906 |
| 3,939,745 | 2/1976 | Weeks et al. | 83/425.3 |
| 4,019,357 | 4/1977 | Gokyu | 72/186 |

Primary Examiner—Lowell A. Larson
Attorney, Agent, or Firm—Cushman, Darby & Cushman

[57] ABSTRACT

Fine fibres of steel for use as concrete reinforcement are produced by longitudinally slitting continuous steel strip to form narrow strip segments and severing the strip segments at intervals along their length. The strip is slit longitudinally on passing between a pair of nip rollers having intermeshing circumferential tongues and grooves so that penetration of the tongues into the grooves severs the strip longitudinally. The resulting strip segments are passed between chopping rollers which chop them into discontinuous fibres and also deform the thus formed fibre ends to promote anchorage in the concrete.

9 Claims, 13 Drawing Figures

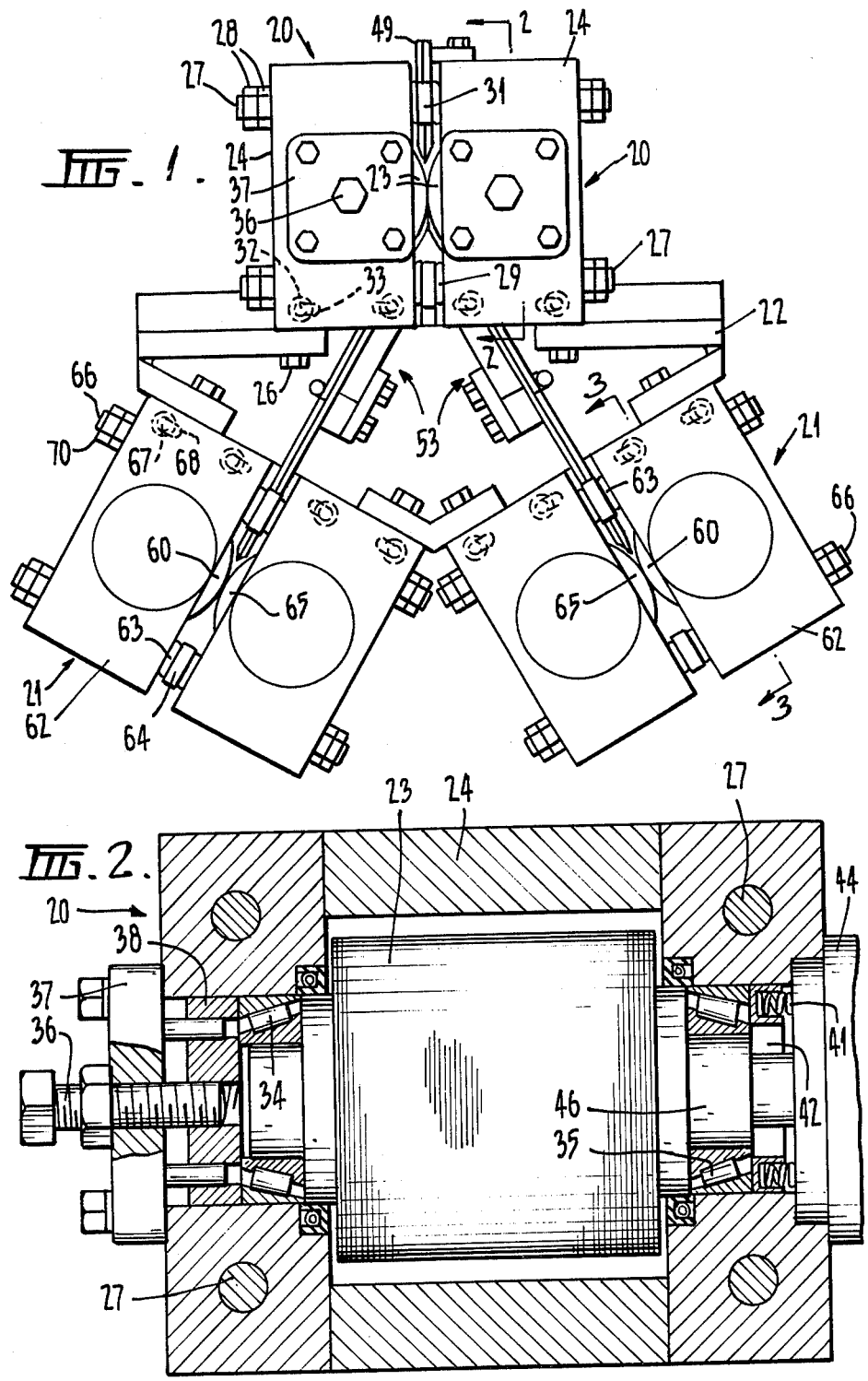

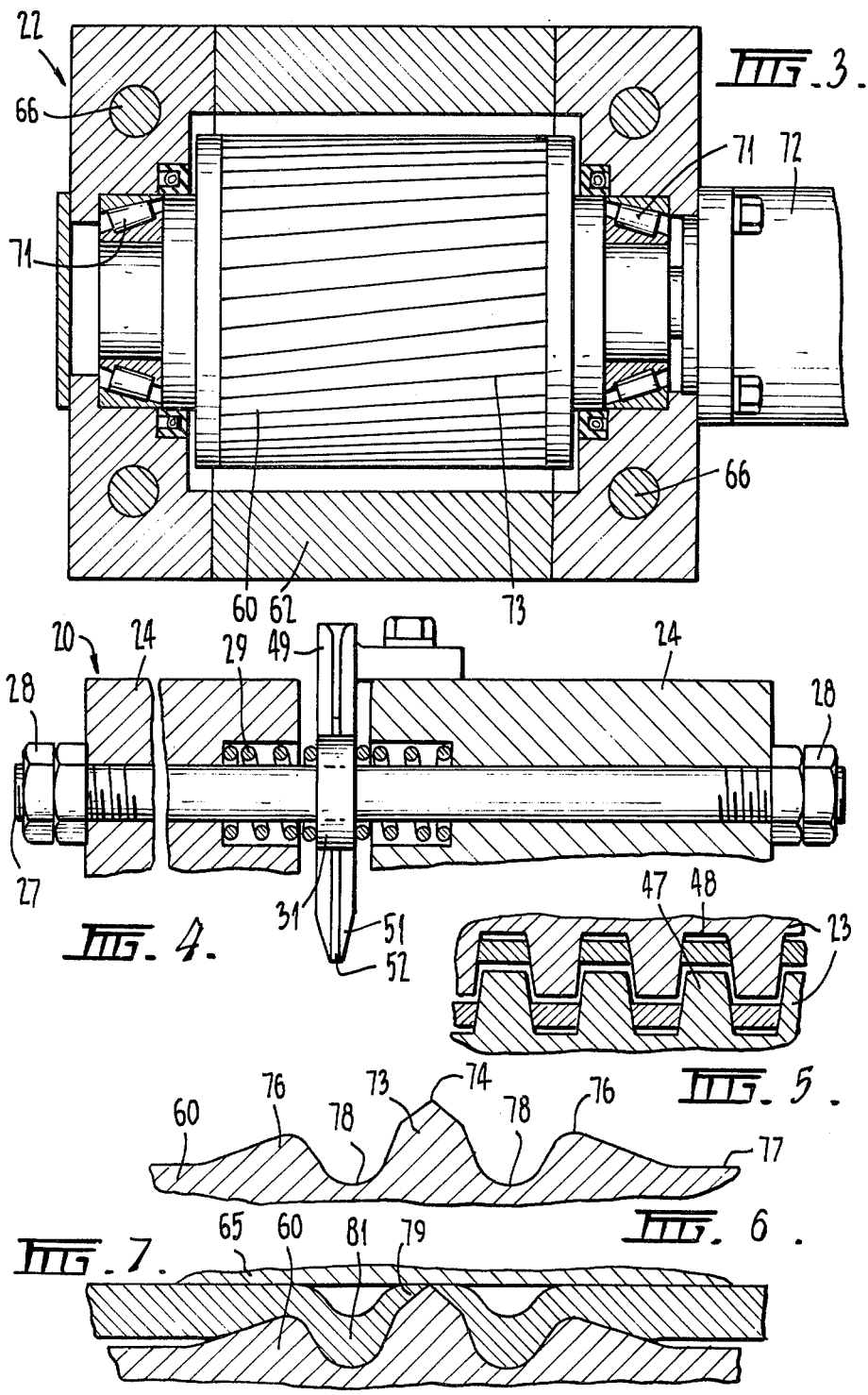

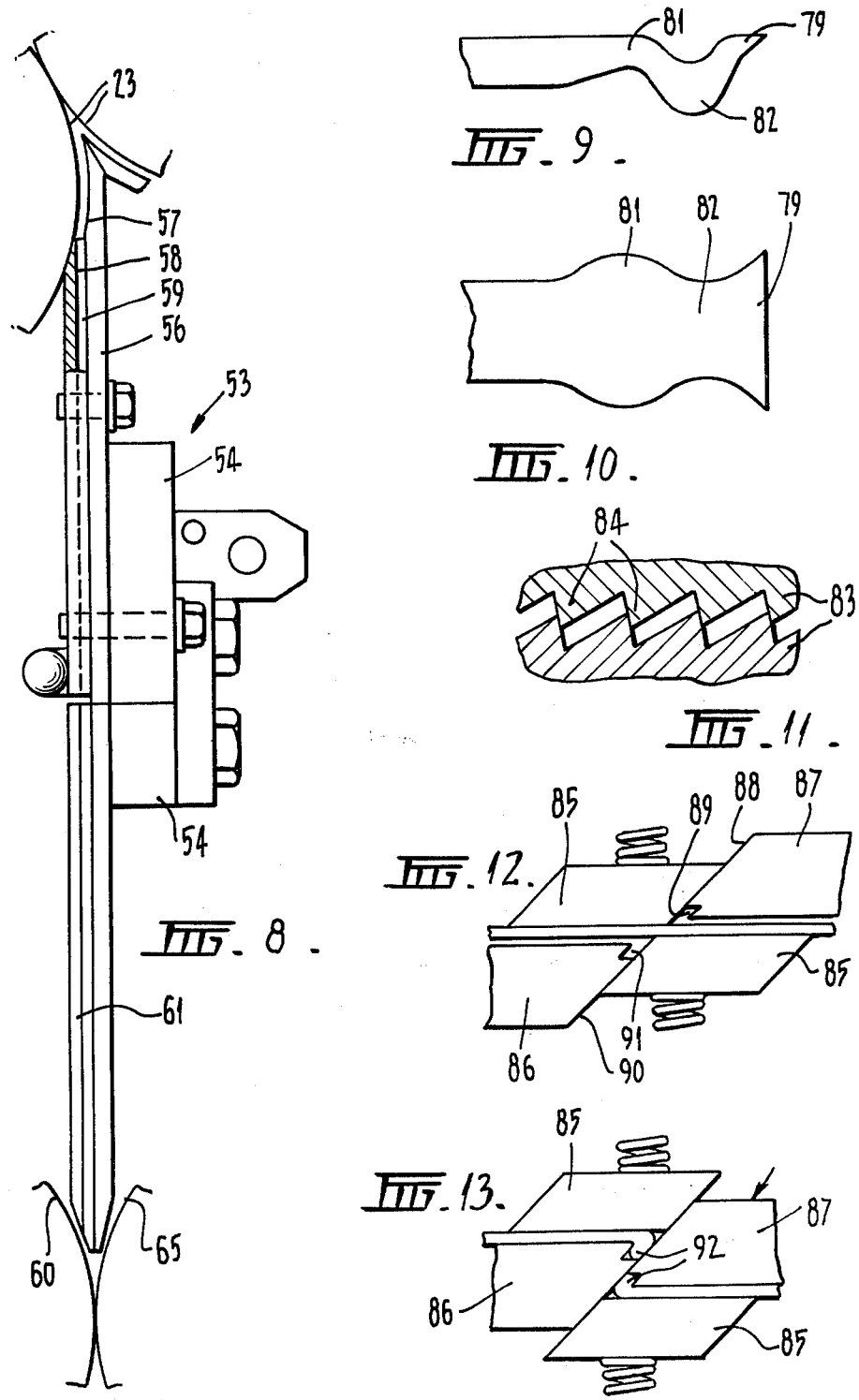

REINFORCEMENT FIBRES

BACKGROUND OF THE INVENTION

This invention relates to the production of reinforcement fibres for reinforcing concrete or other castable materials such as plastics materials and ceramics.

It is known to use short chopped lengths of steel wire as reinforcing fibres in concrete. One example of such use is described in Australian Pat. No. 290,468. It is also known to produce reinforcing fibres from sheet or strip material. For example, Australian Pat. No. 478,169 describes a method in which a thin strip having a width of about 0.25 inches to about 3 inches is chopped or sheared transversely to produce reinforcing fibres having a width of about 0.01 to about 0.06 inches. It has been found that the bonding of the fibres within the concrete or other matrix can be improved if the fibres have areas of local deformation and in the method described in Australian Pat. No. 478,169 the strip is initially roll-formed before it is sheared so that it has enlarged edges whereby the resulting fibres have enlarged ends helping to anchor them firmly within the concrete or make other matrix material.

SUMMARY OF THE INVENTION

The present invention provides an alternative method of producing reinforced fibres from strip material. In contrast to the method described in Australian Pat. No. 478,169 in which the long side edges of the fibres are formed by cutting transversely across the strip, the method of the present invention involves forming longer sides of the fibres by a slitting operation in which the strip is slit longitudinally to produce long fibres of appropriate width which are subsequently chopped to length.

Specifically, the present invention provides a method of forming discontinuous fibres of a material suitable for reinforcing concrete or other castable substance, comprising slitting a strip of said material longitudinally of the strip into a plurality of strip segments each of width less than 0.10 inches and severing the strip segments transversely at intervals along their lengths so as to divide them into discontinuous fibres.

Preferably the strip material is drawn from a supply roller through a slitting device which slits the strip longitudinally as it passes through that device so as to produce one or more moving bands of said strip segments and the or each band of strip segments is passed through a severing device which severs all of the strip segments in the band at said intervals.

Preferably, the strip material has a thickness of less than 0.025 inches. It may, for example be steel strip of thickness of the order of 0.010 inches.

The strip segments may be severed at said intervals in such a way that the ends of each fibre so produced are locally deformed. They may, for example be simultaneously severed and squashed to produce localised widening at each fibre end. In that case the method may include the steps of separating alternate strip segments from the strip segments intermediate the alternate segments to form two separate bands of strip segments in each of which the strip segments are spaced apart from one another by distances at least equal to the widths of the strip segments and severing the segments of each band in such a way that they are locally squashed so as to be widened at the positions where they are severed. The local deformation may also include bending of the strip segments so that the fibre ends are longitudinally bent or hooked.

In an alternative method according to the invention the strip segments are locally deformed at spaced locations along their lengths before these segments are severed transversely at said intervals whereby to produce discontinuous fibres which have locations of local deformation spaced along their lengths.

The invention also extends to apparatus for producing discontinuous fibres from strip material, comprising slitting means operable to slit the strip material longitudinally into a plurality of strip segments of width less than 0.10 inches and severing means operable to sever the strip segments transversely at intervals along their lengths so as to divide the strip segments into discontinuous fibres.

The slitting means may comprise a pair of slitting rollers operable continuously to slit strip material passed through a nip between them. Such slitting rollers may be formed with circumferentially extending tongue and groove formations which intermesh at the nip so that the penetration of the tongues into the grooves severs the strip longitudinally into said strip segments.

The tongues and grooves of each roller may be of rectangular configuration and the penetration of the roller tongues into the grooves may cause a mutual lateral displacement between alternate strip segments across the strip and the intermediate strip segments such that the strip segments are delivered from the nip in two diverging bands of segments in each of which the strip segments are spaced apart by distances equal to the widths of the segments.

The severing means may comprise a pair of chopping rollers. One of these rollers may have a plain cylindrical peripheral surface and the other may be formed with one or more teeth to cooperate with the plain roller transversely to sever the strip segments.

The invention also extends to fibres produced by the above method and to cast composites incorporating such fibres as reinforcement.

The invention also provides a method of forming discontinuous fibres from continuous fibres comprising severing the continuous fibres at regular intervals along their lengths and simultaneously deforming them in the regions where they are severed whereby to produce discontinuous fibres the ends of which are flattened and widened at their extremities and at locations spaced from the extremities and are longitudinally curved between said extremities and said locations. The invention further extends to apparatus for performing that method and to reinforcing fibres which have a length in the range 0.25 to 3 inches and which are of uniform rectangular cross-section except at their ends where they are flattened and widened at their extremities and at regions spaced back from their extremities and are longitudinally curved between said extremities and said regions.

In order that the invention may be more fully explained some particular embodiments will be described with reference to the accompanying drawings.

BRIEF DESCRIPTION OF THE DRAWINGS

FIG. 1 is a front elevation of a machine operable in accordance with the invention and including a strip slitting device 20 and two fibre chopping devices 21;

FIG. 2 is a cross-section on the line 2—2 in FIG. 1;

FIG. 3 is a cross-section on the line 3—3 in FIG. 1;

FIG. 4 is a vertical cross-section through an upper part of slitting device 20;

FIG. 5 is a cross-section through intermeshing tongues and grooves of a pair of slitting rollers incorporated in slitting device 20;

FIG. 6 illustrates the profile of chopping teeth formed on chopping rollers of the chopping devices 21;

FIG. 7 illustrates the manner in which teeth on each chopping roller co-operate with a plain roller to produce fibres with deformed ends;

FIG. 8 is a partly sectional elevation of part of the machine between the slitting device 20 and one of the chopping devices 21;

FIG. 9 is a greatly enlarged elevation of a fibre end;

FIG. 10 is a greatly enlarged plan of the fibre end shown in FIG. 9;

FIG. 11 is a cross-section through intermeshing teeth of slitting rollers in an alternative type of machine also constructed in accordance with the invention; and FIGS. 12 and 13 illustrate the operation of a chopping device in the alternative machine.

DESCRIPTION OF PREFERRED EMBODIMENT

In the machine illustrated in FIGS. 1 to 8 the slitting device 20 and the two chopping devices 21 are carried on a main machine frame 22. Slitting device 20 comprises a pair of horizontal slitting rollers 23 arranged side-by-side to form a nip between them and having circumferentially extending tongue and groove formations which intermesh at the nip. These rollers are mounted in respective roller housings 24 held to the main frame by bolts 26. On loosening of bolts 26 roller housings 24 can be moved horizontally toward or away from one another by means of adjustment bolts 27 and nuts 28 to adjust the degree of intermeshing at the nip.

Adjustment bolts 27 extend through horizontal bores in the upper and lower parts of housings 24 and through upper and lower springs 29 which are located in counter bores in the inner faces of housings 24 and bear against central abutment bars 31 forming part of the main frame. Springs 29 provide outward biasing forces which urge housings 24 outwardly against ajustment nuts 28 so that the housings can be moved simply by operation of those nuts. During such adjustment horizontal pegs 32 fixed to the main frame slide in horizontal slots 33 formed in the lower parts of housings 24 to guide the housings.

Each slitting roller 23 is mounted in its respective housing 24 by means of a pair of tapered roller bearings 34,35. The position of the roller can be finely adjusted in the longitudinal direction by means of a differential screw 36 acting between an end capping 37 on housing 24 and a pressure plate 38 which acts against the end of the outer race of roller bearing 34. The outer race of the other roller bearing 35 abuts a ring 39 which has circumferentially spaced bores receiving coil springs 41 which engage a flange 42 on the housing of an hydraulic motor 44. With this arrangement the position of the roller can be adjusted very accurately in the longitudinal direction by operation of differential screw 36 which moves the roller against springs 41. Once the roller has been set thermal expansion is accommodated by compression of springs 41. Thus the rollers can be set so that their tongue and groove formations mesh very accurately and this accuracy is maintained even when the rollers become hot during operation of the machine since their thermal expansion is confined to equal extensions in the same direction.

Rollers 23 are driven by a pair of hydraulic motors 44 through stub shafts 46.

The intermeshing tongue and groove formations of rollers 23 is shown in FIG. 5. Each roller has circumferential tongues 47 and grooves 48. These tongues and grooves are of generally rectangular profile but their side faces are slightly relieved. In a typical machine the distance between the crests of the teeth and the roots of the grooves is 0.020 to 0.025 inches, the groove width is 0.020 inches at the root and about 0.0015 inches relief is provided at each side face so that the tooth crests are about 0.017 inches wide. The rollers are adjusted so that their tooth and groove formations intermesh very accurately with very slight clearance between their side faces, this clearance being very much less than the thickness of the strip material which is to be slit.

The material to be slit may be supplied in roll form and is fed between the slitting rollers 23 via a guide 49 mounted on the upper central abutment bar 31 of the main frame. Guide 49 has a tapered nose 51 projecting into the nip between rollers 23 and a central slot 52 along which the input strip material is fed to the nip.

One particular suitable feed material is steel strip of the type used in the manufacture of tinplate cans. Typically this material has a thickness of the order of 9 or 11 thousandths of an inch. As this material is passed between rollers 23 the intermeshing tongue and groove formations of the two rollers act to slit the strip longitudinally into a large number of strip segments in the form of continuous fibres of about 0.020 inches width. The rollers provide a continuous shearing action and as indicated in FIG. 5 the teeth 47 of the two rollers displace adjacent fibres relative to one another so that alternate fibres across the width of the strip are pressed into the roots of the grooves of one roller whereas the intermediate fibres are pressed into the groove roots of the other roller. As the fibres emerge from the nip between the rollers fibres which are located in the grooves of one roller tend to allow that roller whereas the fibres contained in the roots of the other roller tend to follow that roller. This results in a separation of the two sets of fibres which are therefore directed from the nip as two diverging bands of continuous fibres with the fibres in each band spaced apart across the band at a spacing equal to the width of one fibre.

The two bands of continuous fibres are fed via respective guide devices denoted generally as 53 one to each of the chopping devices 21. Each chopping device comprises a pair of rollers which act to chop the continuous fibres in each band into short lengths. The two chopping devices are mutually inclined to suit the diverging paths of the two bands of continuous fibres so that the two bands can be fed directly into the nips between the respective sets of chopping rollers.

The construction of the fibre band guide devices 53 can best be seen in FIG. 8. Each has a mounting bracket 54 by which it is bolted to the main machine frame and comprises a long guide plate 56 the upper end of which projects into the output side of the nip between slitting rollers 23. This upper end of the guide plate is cylindrically curved at 57 so that it can be positioned closely adjacent the outer crests of the respective slitting roller teeth. A metal comb plate 58 is bolted to guide plate 56. The upper edge of this plate has comb teeth which register with the grooves of the slitting roller and which serve to strip the continuous fibers from those grooves and direct them as a band along a slot 59 formed at the interface between the comb plate and the guide plate.

This slot is continued through a guide structure 61 at the bottom end of the guide device and the band of continuous fibres is fed through this guide directly into the nip between the rollers of the respective chopping devices 21.

Each chopping device has a toothed chopping roller 60 and a plain faced backing or anvil roller 65 against which the teeth of the chopping roller act to chop the continuous fibres into discrete lengths. The two chopping rollers are mounted in housings 62 which are mounted on the machine frame in similar fashion to the roller housings of the slitting devices so that they can be carried toward and away from one another. Central biasing springs 63 act against abutment bars 64 on the main frame to urge the housings 62 outwardly against the adjustment nuts 70 at the ends of adjustment bolts 66 which extend through long bores through two housings. Pegs 67 on the main frame move in guide slots 68 in the two housings during such roller adjustment.

FIG. 3 illustrates the mounting of one of the chopping rollers within its respective housings by means of a pair of roller bearings 71 and the other roller is mounted in similar fashion. The rollers are driven by hydraulic motors 72.

The formation of the teeth on chopping roller 60 is illustrated in FIGS. 3 and 6. As seen in FIG. 3 the roller has circumferentially spaced chopping teeth 73 which extend across the roller at a small helix angle of the order of 5° to 6°. As shown in FIG. 6 each chopping tooth 73 has a sharp edge 74 and is disposed between a pair of lower and blunter coining teeth 76 which also project outwardly from the periphery 77 of the roller. A pair of grooves 78 are formed between the cutting tooth 73 and the two coining teeth 76.

The rollers of the chopping device are adjusted so that there is a very small nip clearance between cuttings edges 74 and the plain face of anvil roller 65. The cutting teeth therefore cooperate with the anvil roller to chop the continuous fibres into discrete lengths. Because of the small nip clearance between the rollers the cutting teeth cannot cut completely through the fibres by simple chopping action and the fibres tend to stay joined by their webs. However, the rollers are rotated at a slightly higher speed than the slit strip and this causes the webs to part so that the fibres are completely severed. The particular configuration of the cutting teeth 73 and coining teeth 76 on roller 60 also causes local deformation of the fibres in the vicinity of their chopped ends.

As shown in FIG. 7 the fibre is gripped between the anvil roller and the coining teeth 76 as it is penetrated by cutting tooth 73. The coining teeth 76 squash the fibre so that at two locations spaced back from the severance line it is flattened and widened. The cutting tooth 73 also flattens and widens the fibre at the severance line. Since the fibre is unrestrained where it extends across the grooves 78 between coining teeth 76 and cutting teeth 73 it is caused to bend into the grooves 78 before the severing action is completed. Thus each severing action is such as to produce a rear end of one fibre and a leading end for the next fibre and both ends are locally deformed so as to have a widened generally fish tailed shape extremity 79, a squashed and laterally widened portion 81 spaced at about 0.5 m.m. from the fibre end and an intermediate portion 82 which joins portions 79 and 81 and which is curved in the longitudinal direction of the fibres. (See FIGS. 9 and 10).

The short steel fibres produced by chopping device 21 may be fed directly into a concrete mixer in which they are dispersed throughout the concrete. It has been found that they provide excellent reinforcing characteristics and that because of their particular end formations they are very firmly anchored and bonded within the concrete matrix when the concrete sets.

The machine illustrated in FIGS. 1 to 8 can be operated at high speed to produce a continuous supply of metal fibres. Because the long side edges of the fibres are produced by longitudinal slitting of the supply material the rolling grain of the metal extends longitudinally of the fibres and they are accordingly stronger in tension than fibres in which the long side edges are produced by transverse severing of a supply strip. Moreover, the long side edges of all of the fibres are produced simultaneously by a multiple slitting operation with cutting edges which progress along the supply strip. In the case where the long side edges are produced by cutting transversely of the strip feed direction the slits must be made individually and in succession. Each shear cut must then be made at a very high shearing speed and over a relatively long length. With the longitudinal arrangement there is a continuous shearing action to produce a large number of fibres simultaneously and the shearing speed at each slit can be very much less. This arrangement therefore suffers less from heating problems and wear of the cutting teeth. The illustrated machine is also extremely compact and it does not suffer from problems of adjustment which can be expected in cases where the long side edges of the fibres are cut transversely of the strip feed direction. The machine is so compact that it can quite readily be mounted directly over a concrete mixer so avoiding the problem of disentangling the fibres which arises when the fibres must be collected and transferred to the concrete mixer. Since the anchoring formations at the ends of the fibres are produced simultaneously with the chopping action a separate deformation step is eliminated.

In the machine illustrated in FIGS. 1 to 8 the separation of the continuous fibres into two separate bands in each of which the fibres are spaced apart enables the fibres ends to be squashed and widened considerably without producing any problems of fibre entanglement. However, it is also possible in accordance with the present invention to produce a band of continuous fibres which are not appreciably separated from one another and to chop these fibres in such a way as to produce an end formation which will serve as an anchor within the concrete mixer but which does not significantly widen the fibre. A machine which operates in this manner is illustrated in FIGS. 11 to 13.

FIG. 11 shows a pair of strip slitting rollers 83 provided with peripheral teeth 84 of saw tooth formation. When a strip of sheet metal is fed between these rollers the strip is slit longitudinally along the lines where the tips of the teeth come together. The continuous fibres which are thus produced tend to twist slightly into alignment with the pockets formed between the two sets of teeth but they are not separated from one another appreciably and emerge from the rollers as a band of closely spaced continuous fibres. These fibres are then passed through a chopping device as illustrated in FIGS. 12 and 13. This device serves to chop the fibres into discrete lengths and simultaneously to compress or upset the resulting fibre ends so that these are produced with small burrs or barbs. The chopping device in this case comprises a pair of spring loaded pressure plates 85, a fixed anvil 86 and a moving punch 87. The punch has an inclined side face 88 which moves across a similarly inclined side face 90 of the anvil and the spring loaded pressure plates may have similarly inclined side faces so as to closely abut the respective side faces of the punch and the anvil. The cutting edge of the punch is formed with an angular notch 89 and the cooperating edge of the anvil has a similar notch 91. As the band of continuous fibres is fed between the punch and the anvil the punch is operated intermittently to sever the fibres obliquely and the notches 89,91 of the punch and anvil cause the free fibre ends to be deformed into burrs or barbs 92 which serve as anchoring formations when the fibres are mixed in the concrete.

The machines which have been illustrated in the drawings are advanced by way of example only and these can be modified considerably. For example it would be possible to pass the continuous fibres through a device to produce regions of local deformation at intervals along their length before they are chopped to length. This device could, for example, comprise a pair of nip rollers at least one of which is knurled, corrugated or otherwise formed to produce appropriate local deformation of the fibres passed between the rollers. The chopping device could, of course, be modified considerably. It could, for example, comprise chopping rollers shaped to provide appropriate deformation of the fibre ends. It is accordingly to be understood that the invention is in no way limited to any of the details of the illustrated construction and that many modifications and variations will fall within the scope of the appended claims.

We claim:

1. A method of forming discontinuous fibres of material suitable for reinforcing concrete or other castable substance, comprising:

feeding a strip of said material having a thickness of about 0.025 inches or less longitudinally between a pair of slitting rollers having circumferentially extending intermeshing tongue and groove formations of rectangular configuration whereby to slit the strip longitudinally into strip segments each of segment width less than 0.10 inches, said strip segments moving from the slitting rollers as a pair of bands of strip segments defined by mutual lateral displacement between alternate strip segments across the strip and the intermediate strip segments due to penetration of the tongue formations into the groove formations;

feeding the bands of strip segments moving from the slitting rollers to a pair of severing devices while the strip segments of the band are still integrally attached to the feed strip; and operating each severing device to transversely sever all of the strip segments of the respective band at regular intervals along the band whereby to divide them into discontinuous fibres and also simultaneously to deform the strip segments in the regions where they are severed in such a way that the discontinuous fibres have ends which are flattened and widened at their extremities and are longitudinally curved adjacent those extremities.

2. A method as claimed in claim 1, wherein each severing device also operates to locally widen and flatten the strip segments at locations spaced from the positions where they are severed whereby the fibre ends are flattened and widened both at their extremities and at locations spaced from the extremities and are longitudinally curved between said extremities and said locations.

3. Apparatus for producing discontinuous fibres from said strip material, comprising:

a pair of strip slitting rollers forming a nip and having circumferentially extending intermeshing tongue and groove formations of rectangular configuration to slit strip material passed through the nip into the strip segments of segment width less than 0.10 inches and thickness of about 0.025 inches or less, penetration of the roller tongues into the grooves causing mutual lateral displacement between alternate strip segments across the strip and the intermediate strip segments whereby the strip segments are delivered from the nip in two bands;

strip feed means to feed strip material to the nip between the slitting rollers;

a pair of band stripping means each effective to strip the strip segments of one of the bands from the grooves of one of the slitting rollers; and a pair of severing devices to receive said band of strip segments while the segments are integrally attached to the feed strip and each operable transversely to sever all of the strip segments of the respective band at regular intervals along the band so as to divide them into discontinuous fibres, each severing device comprising a cylindrical anvil roller and a toothed roller forming with the anvil roller a nip to receive the respective band of strip segments, the toothed roller being provided with circumferentially spaced longitudinally extending sharp-edged chopping teeth cooperable with the anvil roller transversely to sever the strip segments of the band.

4. Apparatus as claimed in claim 3, wherein each band stripping means comprises a set of comb-like teeth projecting into the grooves of the respective slitting roller so as to strip the strip segments from those grooves.

5. Apparatus as claimed in claim 3, wherein said chopping teeth extend along the toothed roller at a slight helix angle so as to act progressively across the band of the strip segments to be severed as the band passes through the nip.

6. Apparatus for producing discontinuous fibres from strip material, comprising a pair of strip slitting rollers forming a nip and having circumferentially extending intermeshing tongue and groove formations of rectangular configuration to slit strip material passed through the nip into strip segments of segment width less than 0.10 inches and thickness of about 0.025 inches or less, penetration of the roller tongues into the grooves causing mutual lateral displacement between alternate strip segments across the strip and the intermediate strip segments whereby the strip segments are delivered from the nip in two bands;

strip feed means to feed strip material to the nip between the slitting rollers;

a pair of band stripping means each effective to strip the strip segments of one of the bands from the grooves of one of the slitting rollers; and a pair of severing devices to receive said band of strip segments while the segments are integrally attached to the feed strip and each operable transversely to sever all of the strip segments of the respective band at regular intervals along the band so as to divide them into discontinuous fibres, each severing device comprising a cylindrical anvil roller and a toothed roller forming with the anvil roller a nip to receive the respective band of strip segments, the toothed roller being formed with circumferentially spaced toothed formations each comprising a sharp-edged fibre chopping tooth, a pair of blunter fibre coining teeth spaced one to either side of the chopping tooth and a pair of outwardly facing grooves defined between the chopping tooth and the coining teeth whereby, in operation of the apparatus, the strip segments are acted on successively by the toothed formations such that they are locally widened and flattened by the coining teeth and the chopping teeth and longitudinally curved into said grooves and are also severed by the chopping teeth to produce discontinuous fibre ends all of which are flattened and widened at their extremities and at locations spaced from the extremities and are longitudinally curved between said extremities and said locations.

7. Apparatus as claimed in claim 6, wherein the chopping teeth project radially outwardly of said toothed roller further than the coining teeth.

8. Apparatus as claimed in claim 7, wherein each band stripping means comprising a set of comb-like teeth projecting into the grooves of the respective slitting roller so as to strip the strip segments from those grooves.

9. Apparatus as claimed in claim 6, wherein said circumferentially spaced toothed formations extend along the toothed roller at a slight helix angle so as to act progressively across the band of strip segments to be severed as that band passes through the nip.

* * * * *